United States Patent
Nguyen et al.

(10) Patent No.: US 10,214,682 B2
(45) Date of Patent: Feb. 26, 2019

(54) MICRO-PROPPANT FRACTURING FLUID COMPOSITIONS FOR ENHANCING COMPLEX FRACTURE NETWORK PERFORMANCE

(71) Applicant: HALLIBURTON ENERGY SERVICES, INC., Houston, TX (US)

(72) Inventors: Philip D. Nguyen, Houston, TX (US); Loan K. Vo, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/753,531

(22) PCT Filed: Oct. 26, 2015

(86) PCT No.: PCT/US2015/057400
§ 371 (c)(1),
(2) Date: Feb. 19, 2018

(87) PCT Pub. No.: WO2017/074304
PCT Pub. Date: May 4, 2017

(65) Prior Publication Data
US 2018/0237685 A1    Aug. 23, 2018

(51) Int. Cl.
*E21B 43/267* (2006.01)
*C09K 8/68* (2006.01)
*C09K 8/60* (2006.01)
*C09K 8/70* (2006.01)
(Continued)

(52) U.S. Cl.
CPC ............... *C09K 8/68* (2013.01); *C09K 8/602* (2013.01); *C09K 8/703* (2013.01); *C09K 8/80* (2013.01); *C09K 8/86* (2013.01); *E21B 43/267* (2013.01); *C09K 2208/30* (2013.01)

(58) Field of Classification Search
CPC .... E21B 43/267; E21B 43/26; E21B 43/2405; E21B 43/25; C09K 8/80; C09K 8/805
See application file for complete search history.

(56) References Cited

U.S. PATENT DOCUMENTS

| 6,035,936 A | 3/2000 | Whalen |
| 6,508,307 B1 | 1/2003 | Almaguer |
| 6,742,590 B1 | 6/2004 | Nguyen |

(Continued)

FOREIGN PATENT DOCUMENTS

| WO | 2014140055 A1 | 9/2014 |
| WO | 2015038153 A1 | 3/2015 |

(Continued)

OTHER PUBLICATIONS

International Search Report and Written Opinion; PCT Application No. PCT/US2015/057400; dated Oct. 26, 2015.

(Continued)

*Primary Examiner* — Zakiya W Bates
(74) *Attorney, Agent, or Firm* — Polsinelli PC

(57) ABSTRACT

Fracturing fluid compositions that include at least one viscoelastic surfactant and micro-proppant particulates. The disclosed fracturing fluid compositions provide enhanced delivery and placement of micro-proppant particulates into the microfractures of the complex fracture network while mitigating any potential fracture damage resulting from gel residue. Methods of hydraulic fracturing using the disclosed fracturing fluid compositions are provided.

14 Claims, 2 Drawing Sheets

(51) Int. Cl.
*C09K 8/80* (2006.01)
*C09K 8/86* (2006.01)

(56) References Cited

U.S. PATENT DOCUMENTS

| | | |
|---|---|---|
| 6,828,280 B2 | 12/2004 | England et al. |
| 7,084,095 B2 | 8/2006 | Lee et al. |
| 7,178,596 B2 | 2/2007 | Blauch et al. |
| 7,261,160 B2 | 8/2007 | Welton et al. |
| 7,343,972 B2 | 3/2008 | Willingham et al. |
| 8,960,284 B2 | 2/2015 | Nguyen et al. |
| 8,985,213 B2 | 3/2015 | Saini et al. |
| 9,018,146 B2 | 4/2015 | Wheeler et al. |
| 9,074,120 B2 | 7/2015 | Welton |
| 2007/0281869 A1 | 12/2007 | Drochon et al. |
| 2010/0032159 A1 | 2/2010 | Saini et al. |
| 2012/0322700 A1 | 12/2012 | Crews et al. |
| 2014/0034309 A1 | 2/2014 | Saini et al. |
| 2014/0076572 A1 | 3/2014 | Gadberry et al. |
| 2014/0329726 A1 | 11/2014 | Ezell et al. |

FOREIGN PATENT DOCUMENTS

| | | |
|---|---|---|
| WO | 2015041664 A1 | 3/2015 |
| WO | 2015041690 A1 | 3/2015 |
| WO | 2015126371 A1 | 8/2015 |

OTHER PUBLICATIONS

SPE 60322; Samuel, M., Poison, D., Graham, D., Kordziel, W., Waite, T., Waters, G., . . . Downey, R. (Jan. 1, 2000). Viscoelastic Surfactant Fracturing Fluids: Applications in Low Permeability Reservoirs. Society of Petroleum Engineers doi:10.2118/60322-MS.

SPE 98068; Boyer, C. M., Glenn, S. A., Claypool, B. R., Weida, S. D., Adams, J. D., Huck, D. R., & Stidham, J. E. (Jan. 1, 2005). Application of Viscoelastic Fracturing Fluids in Appalachian Basin Reservoirs. Society of Petroleum Engineers. doi:10.2118/98068-MS.

SPE 165177; Yang, J., Guan, B., Lu, Y., Cui, W., Qiu, X., Yang, Z., & Qin, W. (Jun. 5, 2013). Viscoelastic Evaluation of Gemini Surfactant Gel for Hydraulic Fracturing. Society of Petroleum Engineers. doi:10.2118/165177-MS.

MICRO-PROPPANT FRACTURING FLUID COMPOSITIONS FOR ENHANCING COMPLEX FRACTURE NETWORK PERFORMANCE

CROSS-REFERENCE TO RELATED APPLICATIONS

This application is a national stage entry of PCT/US2015/057400 filed Oct. 26, 2015, said application is expressly incorporated herein in its entirety.

FIELD

The present disclosure relates to fracturing operations in subterranean wellbores. In particular, the present disclosure relates to fluids used in hydraulic fracturing operations.

BACKGROUND

Wellbores are drilled into the earth for a variety of purposes including tapping into hydrocarbon bearing formations to extract the hydrocarbons for use as fuel, lubricants, chemical production, and other purposes. Hydrocarbon producing wells can be stimulated using fracturing treatments. In a typical hydraulic fracturing treatment, a fracturing fluid is pumped through a wellbore and into a subterranean formation producing zone at a rate and pressure such that one or more fractures are formed or extended into the zone.

Hydraulic fracturing treatments may produce primary fractures in the near field around the well bore, as well as induced, dendritic fractures (also known as "microfractures") in the far field extending from the primary fractures. These induced, dendritic fractures are generally formed at the tip and edges of the primary fractures, and extend outwardly in a branching tree like manner from the primary fractures, creating a complex fracture network. The complex fracture network encompasses the primary fracture and any and all branching fractures (e.g., secondary branch fractures, tertiary branch fractures, etc.), regardless of their size, man-made or otherwise, within a subterranean formation that are in fluid communication with the wellbore. Because secondary dendritic fractures can extend transversely to the trajectory of the primary fractures, they reach and link natural fractures both in and adjacent to the trajectory of the primary fractures. As such, secondary fractures reach a larger portion of the naturally occurring fracture network, and link the natural fractures back to the primary fractures and the wellbore. Accordingly, communication between the primary fracture and the remainder of the corresponding complex fracture network may be an important factor in maximizing production from the formation.

The fracturing fluid may also function as a carrier fluid that transports solids to a target area. For example, particulate solids, also known as "proppant particulates," "proppants," or "particulates," may be suspended in a portion of the fracturing fluid and transported to a fracture. The suspended particulates are deposited in the fractures so as to prevent the fractures from fully closing once the hydraulic pressure is removed. By keeping the fractures from fully closing, the proppant particulates aid in forming conductive channels through which produced hydrocarbons can readily flow. Accordingly, proppant particulates hold the complex fracture network open, thereby maintaining the ability for hydrocarbons to flow through the complex fracture network to ultimately be produced at the surface.

BRIEF DESCRIPTION OF THE DRAWINGS

In order to describe the manner in which the advantages and features of the disclosure can be obtained, reference is made to embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed compositions and methods may be implemented using any number of techniques. The disclosure should in no way be limited to the illustrative implementations, drawings, and techniques illustrated herein, but may be modified within the scope of the appended claims along with their full scope of equivalents.

In the following discussion and in the claims, the terms "including" and "comprising" are used in an open-ended fashion, and thus should be interpreted to mean "including, but not limited to . . . ". Reference to up or down will be made for purposes of description with "upper," or "uphole" meaning toward the surface of the wellbore and with "lower," or "downhole" meaning toward the terminal end of the well, regardless of the wellbore orientation. The various characteristics described in more detail below, will be readily apparent to those skilled in the art with the aid of this disclosure upon reading the following detailed description, and by referring to the accompanying drawings.

The present disclosure generally relates to fracturing fluid compositions that include at least one viscoelastic surfactant and micro-proppant particulates. The fracturing fluid compositions disclosed herein enhance the production performance of the complex fracture network by improving micro-proppant particulate transport performance during both initiation of the primary fracture and induction of the opening of natural fractures and secondary fractures. The presently disclosed fracturing fluid compositions also enhance delivery and placement of the micro-proppant particulates into the microfractures of the complex fracture network while mitigating any potential fracture damage resulting from gel residue.

The present disclosure also relates to methods of fracturing subterranean formations that include the fracturing fluid compositions disclosed herein. The present disclosure is also directed to a method of forming a temporary downhole fracture blockage that includes the fracturing fluid compositions disclosed herein.

Generally, the fracturing fluid compositions, disclosed herein, are introduced downhole into a fracture within a subterranean formation during a fracturing operation. The fracturing fluids and methods, disclosed herein, may be used during hydraulic fracturing operations to prop primary fractures as well as the dendritic fractures (e.g., secondary branch fractures, tertiary branch fractures, etc.) that form part of the complex fracture network.

Figure 1:
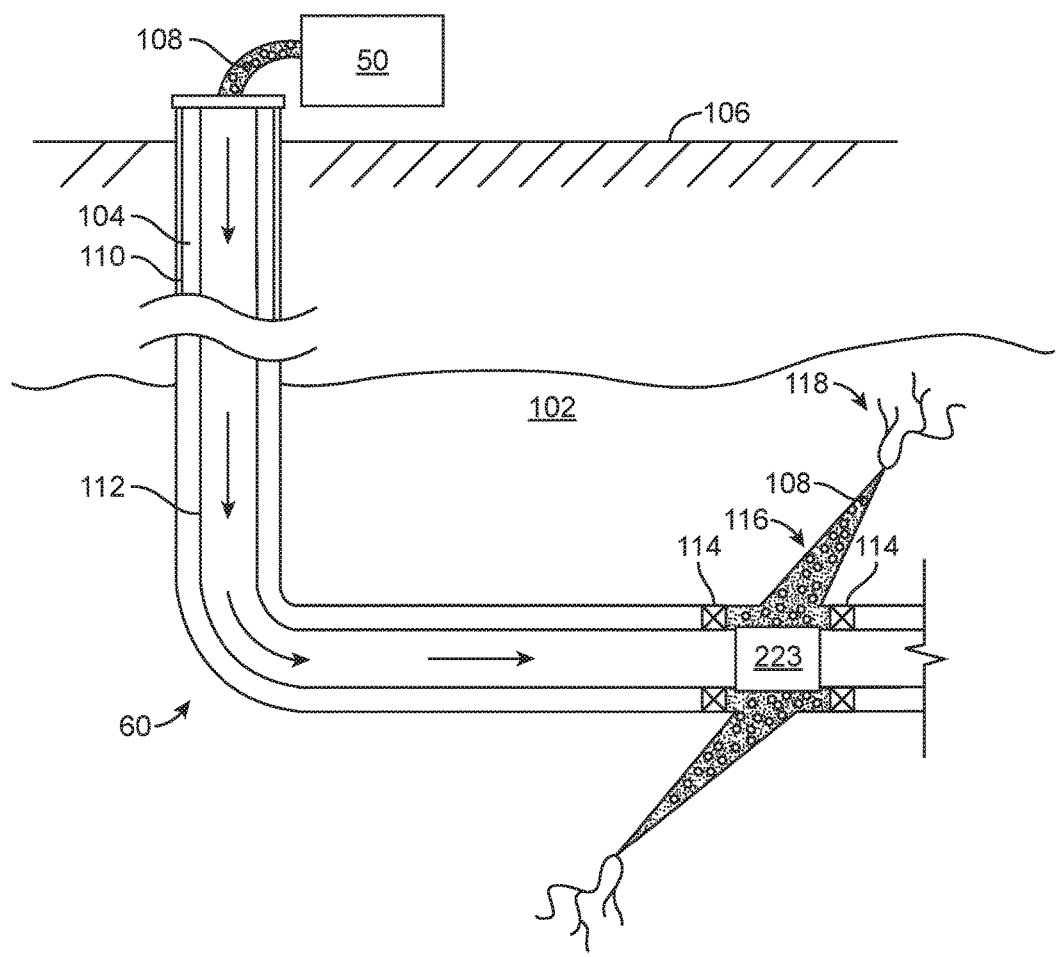
FIG. 1 is a schematic view of a wellbore operating environment in which a fracturing fluid may be deployed in accordance with certain embodiments of the present disclosure.

FIG. 1 illustrates a schematic view of an embodiment of a wellbore operating environment in which a fracturing fluid or liquid concentrate proppant slurry may be deployed. As depicted, wellbore 104 of well 60 extends through various earth strata including a subterranean zone of interest 102. FIG. 1 shows the well 60 during a fracture treatment of zone of interest 102. The subterranean zone 102 can include one or more subterranean formations or a portion of a subterranean formation.

The fracturing fluid 108 is applied to the subterranean zone 102 through wellbore 104 which extends from a terranean surface 106. Although the wellbore 104 in FIG. 1 is shown as vertical deviating to horizontal, the wellbore 104 may include horizontal, vertical, slant, curved, and other types of wellbore geometries and orientations without departing from the spirit and scope of this disclosure. Additionally, the fracturing treatment may be applied to a subterranean zone surrounding any portion of the wellbore 104 without departing from the spirit and scope of this disclosure.

The wellbore 104 can include a casing 110 that is cemented or otherwise secured to the wellbore wall. However, the wellbore 104 can be uncased (e.g., open hole) or include uncased sections without departing from the spirit and scope of the present disclosure. Perforations can be formed in the casing 110 to allow fracturing fluids and/or other materials to flow into the subterranean zone 102. In cased wells, perforations can be formed using shape charges, a perforating gun, hydrojetting and/or other tools.

The well 60 is depicted with a work string 112 depending from the terranean surface 106 into the wellbore 104. A pump and blender system 50 is coupled to the work string 112 to communicate fracturing fluid 108 into the wellbore 104. The pump and blender system 50 resides at the terranean surface 106 at or near well 60. In some cases, the pump and blender system 50 combines a proppant source, such as a liquid concentrate proppant slurry, with a fluid source and possibly other components to form fracturing fluid 108, as shown in more detail in FIG. 2, discussed below. The resulting fracturing fluid 108 may be pumped down the well 60 under pressure to fracture stimulate the subterranean zone 102 thereby enhancing production of hydrocarbons from the subterranean zone 102.

Figure 2:
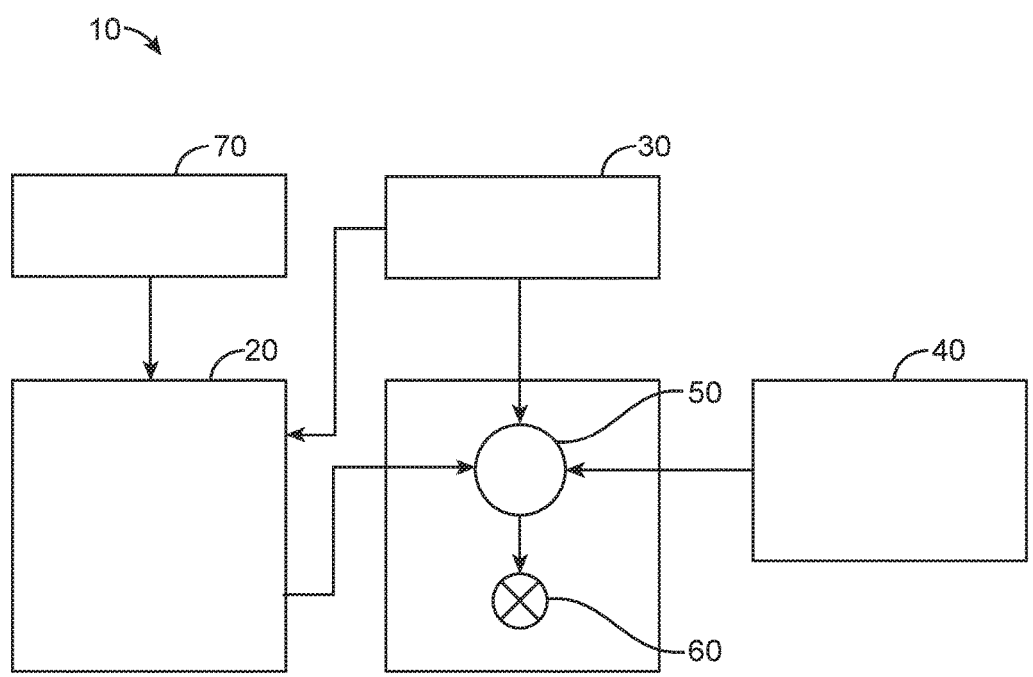
FIG. 2 is a diagram illustrating an example of a fracturing system that may be used in accordance with certain embodiments of the present disclosure.

With reference to FIG. 2, the disclosed methods and compositions may directly or indirectly affect one or more components or pieces of equipment associated with an exemplary fracturing system 10, according to one or more embodiments. The system 10 includes a fracturing fluid producing apparatus 20, a fluid source 30, a proppant source 40, and a pump and blender system 50 and resides at the surface at a well site where a well 60 is located (shown in FIG. 1). In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may include water, a hydrocarbon fluid, a polymer gel, foam, air, wet gases and/or other fluids.

The proppant source 40 can include a proppant for combination with the fracturing fluid, including the microproppant particulates discussed herein. The system may also include additive source 70 that provides one or more additives (e.g., gelling agents, weighting agents, or viscoelastic surfactants, or clay stabilizers disclosed herein and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70 to form fracturing fluid 108 shown in FIG. 1. The resulting mixture may be pumped down the well 60 under a pressure sufficient to create or enhance one or more fractures in a subterranean zone shown in FIG. 1, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 to be sourced from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Referring back to FIG. 1, the work string 112 may include coiled tubing, jointed pipe, and/or other structures that communicate fluid through the wellbore 104. The work string 112 can include flow control devices 223 (e.g., bypass valves, ports, and/or other tools or well devices) that control a flow of fluid from the interior of the work string 112 into the subterranean zone 102. For example, the work string 112 may include ports adjacent the wellbore wall to communicate the fracturing fluid 108 directly into the subterranean zone 102, and/or the work string 112 may include ports that are spaced apart from the wellbore wall to communicate the fracturing fluid 108 into an annulus in the wellbore between the work string 112 and the wellbore wall.

The work string 112 and/or the wellbore 104 may include one or more sets of packers 114 that seal the annulus between the work string 112 and wellbore 104 to define an interval of the wellbore 104 into which the fracturing fluid 108 will be pumped. FIG. 1 depicts two packers 114, one defining an uphole boundary of the interval and one defining the downhole end of the interval.

As depicted, the fracturing treatment of subterranean zone 102 produced both a primary fracture 116 in the near field as well as secondary, induced, dendritic fractures 118 in the far field (dendritic fractures 118 can also be referred to as "microfractures"). The secondary fractures 118 have propagated from or near the ends and edges of the primary fracture 116.

The fracturing treatment may be performed in one or more stages, where different amounts, sizes, and/or concentrations of proppant or, in some stages, no proppant is provided into the fractures 116, 118. For example, in certain instances, the fractures 116, 118 can be initiated with a fracturing fluid containing little or no proppant, then subsequent stages can provide the proppant to the fractures 116, 118 in a manner that fills and props open both the secondary fractures 118 and primary fractures 116. Given the small size of the dendritic, secondary fractures 118, one or more of the stages may introduce a micro-proppant such that the particle size is less than the transverse dimension of the fracture when held open under fracturing pressure. In some cases, the micro-proppant may be smaller than 100 mesh (149 μm), and in certain instances equal to or smaller than 200 mesh (74 μm), 230 mesh (63 μm) or even 325 mesh (44 μm), or smaller. The stages can be arranged to provide proppant such that the secondary fractures 118 are propped by the micro-proppant. The stages can also be arranged to provide the proppant and micro-proppant intermixed and/or some stages can provide substantially just micro-proppant and other stages can provide just larger proppant.

According to the present disclosure, a fracturing fluid composition is provided that includes an aqueous-based carrier fluid, a viscoelastic surfactant, and micro-proppant particulates. The viscoelastic surfactant serves to suspend the micro-proppant in the fracturing fluid and carry the micro-proppant to the fractures where the micro-proppant may be deposited.

According to at least one aspect of the present disclosure, the viscoelastic surfactant is present in the fracturing fluid in sufficient concentration to cause the micro-proppant particulates to be neutrally buoyant in the fracturing fluid. As used herein, the term "neutrally buoyant," generally refers to a particulate being capable of substantially maintaining suspension in a fluid in the absence of mechanical agitation or perturbation. As such, the viscoelastic surfactant may serve as a viscosifier that increases the viscosity of the fracturing fluid so as to cause the micro-proppant to be suspended within the fracturing fluid. Thus, the viscoelastic surfactant provides for effective suspension and transport of the micro-proppants thereby enhancing delivery and placement of the micro-proppant particulates into the microfractures of the complex fracture network.

Commonly-used viscosifiers, including cross-linked polymeric gelling agents as well as other types of viscosifiers, can leave an undesirable residue on the walls of the fractures and on the walls of the wellbore. This residue can cause damage to the subterranean formation and decrease the effectiveness of the subsequent wellbore operations, including inhibiting or preventing reservoir fluid production. Therefore, there is a need for viscosifiers that can be used in fracturing fluids that will suspend micro-proppants and not cause damage to the formation.

It has unexpectedly been found that viscoelastic surfactants can suspend micro-proppants in a fracturing fluid, even at relatively low viscoelastic surfactant concentrations of between about 1% and about 10% by volume. Further, the presently disclosed fracturing fluids can effectively carry the suspended micro-proppants into the microfractures of the complex fracture network. Thus, the fracturing fluid compositions, disclosed herein, provide effective fluid leak-off that is capable of opening up natural fractures and inducing the generation of secondary fractures while ensuring effective placement of micro-proppant particulates in secondary fractures and other fractures of the complex fracture network. Additionally, the fracturing fluids comprising viscoelastic surfactants and micro-proppants, disclosed herein, do not leave gel residues in the propped fractures which can reduce production potential. In at least one aspect of the present disclosure, the fracturing fluid compositions disclosed herein do not necessitate the use of certain additional treatment additives, such as cross-linkers, breakers, and biocides.

A surfactant is an amphiphilic molecule comprising a hydrophobic tail group and a hydrophilic head group. The hydrophilic head can be charged. A cationic surfactant includes a positively-charged head. An anionic surfactant includes a negatively-charged head. Zwitterionic and amphoteric surfactants include both a positively- and negatively-charged head. A surfactant with no charge is called a nonionic surfactant.

If a surfactant is in a sufficient concentration in a solution, then the surfactant molecules can form micelles. A "micelle" is an aggregate of surfactant molecules dispersed in a solution. A surfactant in an oil solution can form reverse-micelles with the hydrophobic tails in contact with the hydrocarbon solvent, sequestering the hydrophilic heads in the center of the reverse-micelle. Conversely, a surfactant in an aqueous solution can form micelles with the hydrophilic heads in contact with the surrounding aqueous solvent, sequestering the hydrophobic tails in the micelle center. The surfactant must be in a sufficient concentration to form a reverse-micelle or micelle, known as the critical micelle concentration. The critical micelle concentration is the concentration of surfactant above which reverse-micelles or micelles are spontaneously formed.

Viscoelasticity is the property of materials that exhibit both viscous and elastic characteristics when undergoing deformation. Viscous materials resist shear flow and strain linearly with time when a stress is applied; whereas elastic materials strain when stretched and quickly return to their original state once the stress is removed. Viscoelastic materials have elements of both of these properties and, as such, exhibit time-dependent strain.

According to at least one aspect of the present disclosure, suitable viscoelastic surfactants may be anionic surfactants, nonionic surfactants, hydrotropic surfactants, zwitterionic surfactants, amphoteric surfactants, or any combination thereof. In some cases, the viscoelastic surfactant may be an anionic surfactant selected from the group consisting of alkyl sulfates, alkyl ether sulfates, alkyl ester sulfonates, alpha olefin sulfonates, linear alkyl benzene sulfonates, branched alkyl benzene sulfonates, linear dodecylbenzene sulfonates, branched dodecylbenzene sulfonates, alkyl benzene sulfonic acids, dodecylbenzene sulfonic acid, sulfosuccinates, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propxylated sulfated octyl phenols, sulfated dodecyl phenols, ethoxylated and propoxylated sulfated dodecyl phenols, and any combination thereof.

In other cases, the viscoelastic surfactant may be a non-ionic surfactant selected from the group consisting of amine oxides, ethoxylated or propoxylated nonyl phenols, ethoxylated or propoxylated alkyl phenols, ethoxylated or propoxylated octyl phenols, ethoxylated or propoxylated dodecyl phenols, ethoxylated or propoxylated primary linear $C_4$ to $C_{20}$ alcohols, polyethylene glycols of all molecular weights and reactions, polypropylene glycols of all molecular weights and reactions, and any combination thereof.

In other cases, the viscoelastic surfactant may be a hydrotropic surfactant selected from the group consisting of dicarboxylic acids, phosphate esters, sodium xylene sulfonate, sodium dodecyl diphenyl ether disulfonate, and any combination thereof.

In other cases, the viscoelastic surfactant may be an amphoteric surfactant that has the general formula:

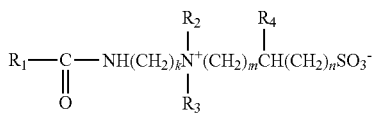

where $R_1$ may be a saturated or unsaturated hydrocarbon group of from about 17 to about 29 carbon atoms; $R_1$ may be a linear or branched hydrocarbon group; $R_1$ may be restricted to a single chain length or may be of mixed chain length such as those groups derived from natural fats and oils or petroleum stocks; $R_2$ and $R_3$ each may be a straight chain or branched alkyl or hydroxyalkyl group of from 1 to about 6 carbon atoms; $R_4$ may be selected from H, alkyl or hydroxyalkyl groups of from 1 to about 4 carbon atoms; k is an integer of from 2-20; m is an integer from 1-20; and n is an integer of from 0-20.

In at least one aspect of the present disclosure, the viscoelastic surfactant may be an amphoteric surfactant selected from the group consisting of erucamidopropyl hydroxypropyl sulfobetaine, erucamidopropyl hydroxyethyl sulfobetaine, erucamidopropyl hydroxymethyl sulfobetaine, and any combination thereof.

In at least one aspect of the present disclosure, the viscoelastic surfactant may be Armovis® EHS, an erucamidopropyl hydroxypropylsultaine, available from AkzoNobel of Chicago, Ill.

In at least one aspect of the present disclosure, the viscoelastic surfactant may be present in the fracturing fluid at a concentration of between about 1% and about 10% by volume. In other cases, the viscoelastic surfactant may be present in the fracturing fluid at a concentration of between about 3% and about 7% by volume.

Typical proppants used in hydraulic fracturing stimulation, in the range of 100 to 12 mesh (149-1680 μm) cannot invade the dendritic fractures, and therefore, will not prop or keep the dendritic fractures open when hydraulic pressure from the fracturing treatment is withdrawn. Therefore micro-proppants smaller than 100 mesh (149 μm), and in certain instances equal to or smaller than 200 mesh (74 μm), 230 mesh (63 μm) or even 325 mesh (44 μm) or smaller, may be used to prop open these induced, dendritic fractures. In certain instances, the size of the micro-proppant can be selected in relation to the size of the dendritic fractures to be propped, such that the particle size is less than the transverse dimension of the dendritic fracture when held open under fracturing pressure.

The micro-proppant particulates suitable for use in the compositions and methods of the present disclosure may be of any size and shape combination known in the art as suitable for use in a fracturing operation. The micro-proppant particulates suitable for use in the compositions and methods of the present disclosure may be any material suitable for use in subterranean operations. Suitable materials for the micro-proppant particulates include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, silica, alumina, fumed carbon, carbon black, graphite, mica, titanium dioxide, meta-silicate, calcium silicate, kaolin, talc, zirconia, boron, fly ash, hollow glass microspheres, ceramic microspheres, solid glass, and any combination thereof.

In some cases, the micro-proppant particulates can be ceramic micro-proppants. In some instances, the micro-proppant particulates can be ceramic microspheres. In some cases, the micro-proppant particulates may be Zeeospheres N-1000, or Zeeospheres N-1200, or a combination of Zeeospheres N-1000 and Zeeospheres N-1200 microspheres available from Zeeospheres™ Ceramics, LLC of Lockport, La., USA.

In some cases, the median particle size of the micro-proppant particulates is less than 150 μm. In some cases, the median particle size of the micro-proppant particulates is between about 10 μm and about 150 μm. In other cases, the median particle size of the micro-proppant particulates is between about 25 μm and about 110 μm.

According to at least one aspect of the present disclosure, the micro-proppant particulates are characterized by an average density of 1.50 g/cm$^3$ or higher. In some cases, the micro-proppant particulates may be characterized by an average density of 2.40 g/cm$^3$ or greater. In other cases, the micro-proppant particulates may be characterized by an average density of 2.60 g/cm$^3$ or greater. In other cases, the micro-proppant particulates may be characterized by an average density between about 2.30 g/cm$^3$ and about 2.70 g/cm$^3$. In other cases, the average density of the micro-proppant particulates is between about 2.0 g/cm$^3$ and about 3.0 g/cm$^3$.

According to at least one aspect of the present disclosure, the micro-proppant particulates are present in the fracturing fluid at a concentration of between about 0.01 pounds per gallon and about 1 pound per gallon.

According to at least one aspect of the present disclosure, the fracturing fluid may also include proppant particulates with a median particle size of at least 150 μm.

According to at least one aspect of the present disclosure, the fracturing fluid can further include a clay stabilizer. Suitable clay stabilizers may include, but are not limited to, a salt, a polymer, a resin, a soluble organic stabilizing compound, and any combination thereof. Other suitable clay stabilizers may include, but are not limited to, potassium chloride, sodium chloride, ammonium chloride, tetramethyl ammonium chloride, and any combination thereof.

In at least one aspect of the present disclosure, an advantage of the fracturing fluid compositions, disclosed herein, is that the fracturing fluids, including the viscoelastic surfactants, may be removed from the complex fracture network and wellbore with producing hydrocarbons or water, without the use of a breaker. A separate breaker system is not required to break the viscosity of the presently disclosed fracturing fluids, comprising viscoelastic surfactants, because the viscosity of the fracturing fluid and viscoelastic surfactants can break upon contact with a hydrocarbon liquid.

According to the present disclosure, a method of fracturing a subterranean formation that includes introducing the fracturing fluid compositions, disclosed herein, into a subterranean formation, using one or more pumps, is provided. Additionally, the present disclosure provides for the use of the fracturing fluid compositions, disclosed herein, as a diverter for primary fracturing completion, in refracturing treatments or in acidizing diversion treatments.

According to the present disclosure, a method of forming a temporary downhole fracture blockage is provided. The method includes introducing the fracturing fluid compositions, disclosed herein, into a subterranean formation having a fracture therein, using one or more pumps, so as to form a temporary fracture blockage, wherein the fracture blockage is capable of diverting subsequently introduced fracturing fluids.

According to the present disclosure, a method of fracturing a subterranean formation is disclosed. The method includes introducing a fracturing fluid, using one or more pumps, into a well that penetrates the subterranean formation. The fracturing fluid includes an aqueous-based carrier fluid, a viscoelastic surfactant, and micro-proppant particulates. In at least one aspect of the present disclosure, the method includes introducing the fracturing fluid into the well at least at a sufficient rate and pressure to create or extend a fracture in the subterranean formation. In at least one aspect of the present disclosure, the method includes introducing the fracturing fluid into the well at least at a sufficient rate and pressure to initiate a primary fracture and to induce the opening of natural fractures or secondary fractures in connection with the primary fractures.

In at least one aspect of the present disclosure, the method further includes allowing leak-off of fracturing fluid into the natural fractures or secondary fractures to enhance placement of micro-proppant particulates into the natural fractures or secondary fractures of the subterranean formation.

In at least one aspect of the present disclosure, the method further includes foaming the fracturing fluid with a foaming agent or gas, such as nitrogen ($N_2$) or carbon dioxide ($CO_2$).

In at least one aspect of the present disclosure, the fracturing fluid used in the presently disclosed method may further include proppant particulates with a median particle size of at least 150 µm. In at least one aspect of the present disclosure, the method may further include introducing a second fracturing fluid, using one or more pumps, into the wellbore, wherein the second fracturing fluid includes an aqueous-based carrier fluid and proppant particulates with a median particle size of at least 150 µm. In at least one aspect of the present disclosure, the second fracturing fluid may further include a viscoelastic surfactant. In at least one aspect of the present disclosure, the second fracturing fluid may further include micro-proppant particulates.

In order to facilitate a better understanding of the present disclosure, the following examples of certain aspects of some embodiments are provided. In no way should the following examples be read to limit, or define, the entire scope of the present disclosure.

Example 1

A fracturing fluid was prepared by first preparing a viscoelastic surfactant solution by mixing Armovis® EHS surfactant, deionized water, and isopropanol at a ratio of 80:10:20 Armovis® EHS:deionized water:isopropanol. The viscoelastic surfactant solution was mixed into water to form a fracturing fluid containing 3% viscoelastic surfactant by volume. Zeeospheres N-1000 micro-proppant was added to the fracturing fluid to obtain a micro-proppant concentration of 0.1 pounds per gallon of fracturing fluid. The fracturing fluid was allowed to build viscosity over time at 140° F. with shearing. Viscosity was observed to be built within 10 minutes under these conditions. Visual inspection of the prepared fracturing fluid indicated that the micro-proppant particulates were fully suspended. Further, pourability tests demonstrated that the prepared 3% viscoelastic surfactant fracturing fluid, with suspended micro-proppant particulates, was able to flow from one container to another.

Example 2

A fracturing fluid was prepared by first preparing a viscoelastic surfactant solution by mixing Armovis® EHS surfactant, deionized water, and isopropanol at a ratio of 80:10:20 Armovis® EHS:deionized water:isopropanol. The viscoelastic surfactant solution was mixed into water to form a fracturing fluid containing 7% viscoelastic surfactant by volume. Zeeospheres N-1000 micro-proppant was added to the fracturing fluid to obtain a micro-proppant concentration of 0.1 pounds per gallon of fracturing fluid. The fracturing fluid was allowed to build viscosity over time at 140° F. with shearing. Viscosity was observed to be built within 10 minutes under these conditions. Visual inspection of the prepared fracturing fluid indicated that the micro-proppant particulates were fully suspended. Further, pourability tests demonstrated that the prepared 7% viscoelastic surfactant fracturing fluid, with suspended micro-proppant particulates, was able to flow from one container to another.

Statements of the Disclosure Include:

Statement 1: A fracturing fluid comprising: an aqueous-based carrier fluid; a viscoelastic surfactant; and micro-proppant particulates.

Statement 2: A fracturing fluid according to Statement 1, wherein the viscoelastic surfactant is selected from the group consisting of anionic surfactants, nonionic surfactants, hydrotropic surfactants, zwitterionic surfactants, amphoteric surfactants, and any combination thereof.

Statement 3: A fracturing fluid according to Statement 1 or Statement 2, wherein the viscoelastic surfactant comprises an anionic surfactant selected from the group consisting of alkyl sulfates, alkyl ether sulfates, alkyl ester sulfonates, alpha olefin sulfonates, linear alkyl benzene sulfonates, branched alkyl benzene sulfonates, linear dodecylbenzene sulfonates, branched dodecylbenzene sulfonates, alkyl benzene sulfonic acids, dodecylbenzene sulfonic acid, sulfosuccinates, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propxylated sulfated octyl phenols, sulfated dodecyl phenols, ethoxylated and propoxylated sulfated dodecyl phenols, and any combination thereof.

Statement 4: A fracturing fluid according to Statement 1 or Statement 2, wherein the viscoelastic surfactant comprises a nonionic surfactant selected from the group consisting of amine oxides, ethoxylated or propoxylated nonyl phenols, ethoxylated or propoxylated alkyl phenols, ethoxylated or propoxylated octyl phenols, ethoxylated or propoxylated dodecyl phenols, ethoxylated or propoxylated primary linear $C_4$ to $C_{20}$ alcohols, polyethylene glycols of all molecular weights and reactions, polypropylene glycols of all molecular weights and reactions, and any combination thereof.

Statement 5: A fracturing fluid according to Statement 1 or Statement 2, wherein the viscoelastic surfactant comprises a hydrotropic surfactant selected from the group consisting of dicarboxylic acids, phosphate esters, sodium xylene sulfonate, sodium dodecyl diphenyl ether disulfonate, and any combination thereof.

Statement 6: A fracturing fluid according to Statement 1 or Statement 2, wherein the viscoelastic surfactant comprises an amphoteric surfactant having the formula:

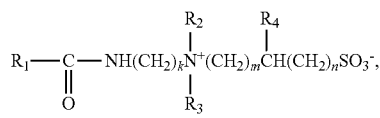

where $R_1$ is a saturated or unsaturated, linear or branched, hydrocarbon group of from about 17 to about 29 carbon atoms; $R_2$ and $R_3$ are each a straight chain or branched alkyl or hydroxyalkyl group of from 1 to about 6 carbon atoms; $R_4$ is a H, alkyl or hydroxyalkyl group of from 1 to about 4 carbon atoms; k is an integer of from 2-20; m is an integer from 1-20; and n is an integer of from 0-20.

Statement 7: A fracturing fluid according to Statement 1 or Statement 2, wherein the viscoelastic surfactant comprises an amphoteric surfactant selected from the group consisting of erucamidopropyl hydroxypropyl sulfobetaine, erucamidopropyl hydroxyethyl sulfobetaine, erucamidopropyl hydroxymethyl sulfobetaine, and any combination thereof.

Statement 8: A fracturing fluid according to Statement 1 or Statement 2, wherein the viscoelastic surfactant comprises erucamidopropyl hydroxypropylsultaine.

Statement 9: A fracturing fluid according to Statement 1 or Statement 2, wherein the viscoelastic surfactant comprises Armovis® EHS.

Statement 10: A fracturing fluid according to any one of the preceding Statements 1-9, wherein the viscoelastic surfactant is present in the fracturing fluid in sufficient concentration to cause the micro-proppant particulates to be neutrally buoyant in the fracturing fluid.

Statement 11: A fracturing fluid according to any one of the preceding Statements 1-10, wherein the viscoelastic surfactant is present in the fracturing fluid at a concentration of between about 1% and about 10% by volume.

Statement 12: A fracturing fluid according to any one of the preceding Statements 1-10, wherein the viscoelastic surfactant is present in the fracturing fluid at a concentration of between about 3% and about 7% by volume.

Statement 13: A fracturing fluid according to any one of the preceding Statements 1-12, wherein the micro-proppant particulates are present in the fracturing fluid at a concentration of between about 0.01 pounds per gallon and about 1 pound per gallon.

Statement 14: A fracturing fluid according to any one of the preceding Statements 1-13, wherein the micro-proppant particulates are selected from the group consisting of sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, silica, alumina, fumed carbon, carbon black, graphite, mica, titanium dioxide, meta-silicate, calcium silicate, kaolin, talc, zirconia, boron, fly ash, hollow glass microspheres, ceramic microspheres, solid glass, and any combination thereof.

Statement 15: A fracturing fluid according to any one of the preceding Statements 1-14, wherein the median particle size of the micro-proppant particulates is less than 150 μm.

Statement 16: A fracturing fluid according to any one of the preceding Statements 1-15, wherein the median particle size of the micro-proppant particulates is between about 10 μm and about 150 μm.

Statement 17: A fracturing fluid according to any one of the preceding Statements 1-16, wherein the median particle size of the micro-proppant particulates is between about 25 μm and about 110 μm.

Statement 18: A fracturing fluid according to any one of the preceding Statements 1-17, wherein the average density of the micro-proppant particulates is at least 2.4 grams per cubic centimeter.

Statement 19: A fracturing fluid according to any one of the preceding Statements 1-18, wherein the average density of the micro-proppant particulates is at least 2.6 grams per cubic centimeter.

Statement 20: A fracturing fluid according to any one of the preceding Statements 1-19, wherein the average density of the micro-proppant particulates is between about 2.0 grams per cubic centimeter and about 3.0 grams per cubic centimeter.

Statement 21: A fracturing fluid according to any one of the preceding Statements 1-20, wherein the average density of the micro-proppant particulates is between about 2.3 grams per cubic centimeter and about 2.7 grams per cubic centimeter.

Statement 22: A fracturing fluid according to any one of the preceding Statements 1-21, wherein the micro-proppant particulates comprise ceramic micro-proppants.

Statement 23: A fracturing fluid according to any one of the preceding Statements 1-22, wherein the micro-proppant particulates comprise ceramic microspheres.

Statement 24: A fracturing fluid according to any one of the preceding Statements 1-23, wherein the micro-proppant particulates comprise Zeeospheres N-1000, Zeeospheres N-1200, or a combination of Zeeospheres N-1000 and Zeeospheres N-1200.

Statement 25: A fracturing fluid according to any one of the preceding Statements 1-24, further comprising a clay stabilizer.

Statement 26: A fracturing fluid according to Statement 25, wherein the clay stabilizer is selected from the group consisting of potassium chloride, sodium chloride, ammonium chloride, tetramethyl ammonium chloride, and any combination thereof.

Statement 27: A fracturing fluid according to Statement 25, wherein the clay stabilizer is selected from the group consisting of a salt, a polymer, a resin, a soluble organic stabilizing compound, and any combination thereof.

Statement 28: A fracturing fluid according to any one of the preceding Statements 1-27, further comprising proppant particulates, wherein the median particle size of the proppant particulates is at least 150 μm.

Statement 29: A method of fracturing a subterranean formation, the method comprising: introducing the fracturing fluid according to any one of the preceding Statements 1-28 into a subterranean formation using one or more pumps.

Statement 30: A method of forming a temporary downhole fracture blockage, the method comprising: introducing the fracturing fluid according to any one of the preceding Statements 1-28 into a subterranean formation having a fracture therein, using one or more pumps, so as to form a temporary fracture blockage, wherein the fracture blockage is capable of diverting subsequently introduced fracturing fluids.

Statement 31: The fracturing fluid according to any one of the preceding Statements 1-28, wherein the fracturing fluid is used as a diverter for primary fracturing completion, in refracturing treatments, or in acidizing diversion treatments.

Statement 32: A method comprising: introducing a fracturing fluid, using one or more pumps, into a wellbore, wherein the fracturing fluid comprises: an aqueous-based carrier fluid; a viscoelastic surfactant; and micro-proppant particulates.

Statement 33: A method of fracturing a subterranean formation according to Statement 32, wherein the introducing of the fracturing fluid is at least at a sufficient rate and pressure to create or extend a fracture in the subterranean formation.

Statement 34: A method of fracturing a subterranean formation according to Statement 32 or Statement 33, wherein introducing of the fracturing fluid is at least at a sufficient rate and pressure to initiate a primary fracture and to induce the opening of natural fractures or secondary fractures in connection with the primary fractures.

Statement 35: A method of fracturing a subterranean formation according to any one of the preceding Statements 32-34, further comprising allowing leak-off of fracturing fluid into the natural fracture or secondary fractures to enhance placement of micro-proppant particulates into the natural fractures or secondary fractures.

Statement 36: A method of fracturing a subterranean formation according to any one of the preceding Statements 32-35, wherein the fracturing fluid is foamed with a foaming agent and a gas.

Statement 37: A method of fracturing a subterranean formation according to Statement 36, wherein the gas is $N_2$ or $CO_2$.

Statement 38: A method of fracturing a subterranean formation according to any one of the preceding Statements 32-37, wherein the viscoelastic surfactant is selected from the group consisting of anionic surfactants, nonionic surfactants, hydrotropic surfactants, zwitterionic surfactants, amphoteric surfactants, and any combination thereof.

Statement 39: A method of fracturing a subterranean formation according to any one of the preceding Statements 32-38, wherein the viscoelastic surfactant comprises an anionic surfactant selected from the group consisting of alkyl sulfates, alkyl ether sulfates, alkyl ester sulfonates, alpha olefin sulfonates, linear alkyl benzene sulfonates, branched alkyl benzene sulfonates, linear dodecylbenzene sulfonates, branched dodecylbenzene sulfonates, alkyl benzene sulfonic acids, dodecylbenzene sulfonic acid, sulfosuccinates, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propoxylated sulfated octyl phenols, sulfated dodecyl phenols, ethoxylated and propoxylated sulfated dodecyl phenols, and any combination thereof.

Statement 40: A method of fracturing a subterranean formation according to any one of the preceding Statements 32-38, wherein the viscoelastic surfactant comprises a nonionic surfactant selected from the group consisting of amine oxides, ethoxylated or propoxylated nonyl phenols, ethoxylated or propoxylated alkyl phenols, ethoxylated or propoxylated octyl phenols, ethoxylated or propoxylated dodecyl phenols, ethoxylated or propoxylated primary linear $C_4$ to $C_{20}$ alcohols, polyethylene glycols of all molecular weights and reactions, polypropylene glycols of all molecular weights and reactions, and any combination thereof.

Statement 41: A method of fracturing a subterranean formation according to any one of the preceding Statements 32-38, wherein the viscoelastic surfactant comprises a hydrotropic surfactant selected from the group consisting of dicarboxylic acids, phosphate esters, sodium xylene sulfonate, sodium dodecyl diphenyl ether disulfonate, and any combination thereof.

Statement 42: A method of fracturing a subterranean formation according to any one of the preceding Statements 32-38, wherein the viscoelastic surfactant comprises an amphoteric surfactant having the formula:

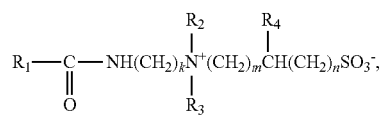

where $R_1$ is a saturated or unsaturated, linear or branched, hydrocarbon group of from about 17 to about 29 carbon atoms; $R_2$ and $R_3$ are each a straight chain or branched alkyl or hydroxyalkyl group of from 1 to about 6 carbon atoms; $R_4$ is a H, alkyl or hydroxyalkyl group of from 1 to about 4 carbon atoms; k is an integer of from 2-20; m is an integer from 1-20; and n is an integer of from 0-20.

Statement 43: A method of fracturing a subterranean formation according to any one of the preceding Statements 32-38, wherein the viscoelastic surfactant comprises an amphoteric surfactant selected from the group consisting of erucamidopropyl hydroxypropyl sulfobetaine, erucamidopropyl hydroxyethyl sulfobetaine, erucamidopropyl hydroxymethyl sulfobetaine, and any combination thereof.

Statement 44: A method of fracturing a subterranean formation according to any one of the preceding Statements 32-38, wherein the viscoelastic surfactant comprises erucamidopropyl hydroxypropylsultaine.

Statement 45: A method of fracturing a subterranean formation according to any one of the preceding Statements 32-38, wherein the viscoelastic surfactant comprises Armovis® EHS.

Statement 46: A method of fracturing a subterranean formation according to any one of the preceding Statements 32-45, wherein the viscoelastic surfactant is present in the fracturing fluid in sufficient concentration to cause the micro-proppant particulates to be neutrally buoyant in the fracturing fluid.

Statement 47: A method of fracturing a subterranean formation according to any one of the preceding Statements 32-46, wherein the viscoelastic surfactant is present in the fracturing fluid at a concentration of between about 1% and about 10% by volume.

Statement 48: A method of fracturing a subterranean formation according to any one of the preceding Statements 32-47, wherein the viscoelastic surfactant is present in the fracturing fluid at a concentration of between about 3% and about 7% by volume.

Statement 49: A method of fracturing a subterranean formation according to any one of the preceding Statements 32-48, wherein the micro-proppant particulates are present in the fracturing fluid at a concentration of between about 0.01 pounds per gallon and about 1 pound per gallon.

Statement 50: A method of fracturing a subterranean formation according to any one of the preceding Statements 32-49, wherein the micro-proppant particulates are selected from the group consisting of sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, silica, alumina, fumed carbon, carbon black, graphite, mica, titanium dioxide, meta-silicate, calcium silicate, kaolin, talc, zirconia, boron, fly ash, hollow glass microspheres, ceramic microspheres, solid glass, and any combination thereof.

Statement 51: A method of fracturing a subterranean formation according to any one of the preceding Statements 32-50, wherein the median particle size of the micro-proppant particulates is less than 150 µm.

Statement 52: A method of fracturing a subterranean formation according to any one of the preceding Statements 32-51, wherein the median particle size of the micro-proppant particulates is between about 10 µm and about 150 µm.

Statement 53: A method of fracturing a subterranean formation according to any one of the preceding Statements 32-52, wherein the median particle size of the micro-proppant particulates is between about 25 µm and about 110 µm.

Statement 54: A method of fracturing a subterranean formation according to any one of the preceding Statements 32-53, wherein the average density of the micro-proppant particulates is at least 2.4 grams per cubic centimeter.

Statement 55: A method of fracturing a subterranean formation according to any one of the preceding Statements 32-54, wherein the average density of the micro-proppant particulates is at least 2.6 grams per cubic centimeter.

Statement 56: A method of fracturing a subterranean formation according to any one of the preceding Statements 32-55, wherein the average density of the micro-proppant particulates is between about 2.0 grams per cubic centimeter and about 3.0 grams per cubic centimeter.

Statement 57: A method of fracturing a subterranean formation according to any one of the preceding Statements 32-56, wherein the average density of the micro-proppant particulates is between about 2.3 grams per cubic centimeter and about 2.7 grams per cubic centimeter.

Statement 58: A method of fracturing a subterranean formation according to any one of the preceding Statements 32-57, wherein the micro-proppant particulates comprise ceramic micro-proppants.

Statement 59: A method of fracturing a subterranean formation according to any one of the preceding Statements 32-58, wherein the micro-proppant particulates comprise ceramic microspheres.

Statement 60: A method of fracturing a subterranean formation according to any one of the preceding Statements 32-59, wherein the micro-proppant particulates comprise Zeeospheres N-1000, Zeeospheres N-1200, or a combination of Zeeospheres N-1000 and Zeeospheres N-1200.

Statement 61: A method of fracturing a subterranean formation according to any one of the preceding Statements 32-60, wherein the fracturing fluid further comprises a clay stabilizer.

Statement 62: A method of fracturing a subterranean formation according to Statement 61, wherein the clay stabilizer is selected from the group consisting of potassium chloride, sodium chloride, ammonium chloride, tetramethyl ammonium chloride, and any combination thereof.

Statement 63: A method of fracturing a subterranean formation according to Statement 61, wherein the clay stabilizer is selected from the group consisting of a salt, a polymer, a resin, a soluble organic stabilizing compound, and any combination thereof.

Statement 64: A method of fracturing a subterranean formation according to any one of the preceding Statements 32-63, wherein the fracturing fluid further comprises proppant particulates, wherein the median particle size of the proppant particulates is at least 150 µm.

Statement 65: A method of fracturing a subterranean formation according to any one of the preceding Statements 32-64, further comprising introducing a second fracturing fluid, using one or more pumps, into the wellbore, wherein the second fracturing fluid comprises: an aqueous-based carrier fluid and proppant particulates, wherein the median particle size of the proppant particulates is at least 150 µm.

Statement 66: A method of fracturing a subterranean formation according to Statement 65, wherein the second fracturing fluid further comprises a viscoelastic surfactant.

Statement 67: A method of fracturing a subterranean formation according to Statement 65 or Statement 66, wherein the second fracturing fluid further comprises micro-proppant particulates.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that a system including either one member of the set, or multiple members of the set, or all members of the set, satisfies the claim.

We claim:
1. A fracturing fluid comprising:
an aqueous-based carrier fluid;
a viscoelastic surfactant present in the fracturing fluid at a concentration of between about 1% and about 5% by volume and comprises an amphoteric surfactant having the formula:

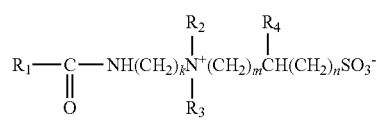

where $R_1$ is a saturated or unsaturated, linear or branched, hydrocarbon group of from about 17 to about 29 carbon atoms; $R_2$ and $R_3$ are each a straight chain or branched alkyl or hydroxyalkyl group of from 1 to about 6 carbon atoms; $R_4$ is a H, alkyl or hydroxyalkyl group of from 1 to about 4 carbon atoms; k is an integer of from 2-20; m is an integer from 1-20; and n is an integer of from 0-20; and
micro-proppant particulates having a median particle size of less than 150 µm.

2. The fracturing fluid of claim 1, wherein the viscoelastic surfactant is selected from the group consisting of anionic surfactants, nonionic surfactants, hydrotropic surfactants, zwitterionic surfactants, amphoteric surfactants, and any combination thereof.

3. The fracturing fluid of claim 1, wherein the viscoelastic surfactant comprises an anionic surfactant selected from the group consisting of alkyl sulfates, alkyl ether sulfates, alkyl ester sulfonates, alpha olefin sulfonates, linear alkyl benzene sulfonates, branched alkyl benzene sulfonates, linear dodecylbenzene sulfonates, branched dodecylbenzene sulfonates, alkyl benzene sulfonic acids, dodecylbenzene sulfonic acid, sulfosuccinates, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propxylated sulfated octyl phenols, sulfated dodecyl phenols, ethoxylated and propoxylated sulfated dodecyl phenols, and any combination thereof.

4. The fracturing fluid of claim 1, wherein the viscoelastic surfactant comprises a nonionic surfactant selected from the group consisting of amine oxides, ethoxylated or propoxylated nonyl phenols, ethoxylated or propoxylated alkyl phenols, ethoxylated or propoxylated octyl phenols, ethoxylated or propoxylated dodecyl phenols, ethoxylated or propoxylated primary linear $C_4$ to $C_{20}$ alcohols, polyethylene glycols of all molecular weights and reactions, polypropylene glycols of all molecular weights and reactions, and any combination thereof.

5. The fracturing fluid of claim 1, wherein the viscoelastic surfactant comprises a hydrotropic surfactant selected from the group consisting of dicarboxylic acids, phosphate esters, sodium xylene sulfonate, sodium dodecyl diphenyl ether disulfonate, and any combination thereof.

6. The fracturing fluid of claim 1, wherein the viscoelastic surfactant is present in the fracturing fluid in sufficient concentration to cause the micro-proppant particulates to be neutrally buoyant in the fracturing fluid.

7. The fracturing fluid of claim 1, wherein the micro-proppant particulates are present in the fracturing fluid at a concentration of between about 0.01 pounds per gallon and about 1 pound per gallon.

8. A method of fracturing a subterranean formation comprising introducing the fracturing fluid of claim 1 into a subterranean formation using one or more pumps.

9. A method comprising:
introducing a fracturing fluid into a wellbore, wherein the fracturing fluid comprises:
an aqueous-based carrier fluid,
a viscoelastic surfactant present in the fracturing fluid at a concentration of between about 1% and about 5% by volume and comprises an amphoteric surfactant having the formula:

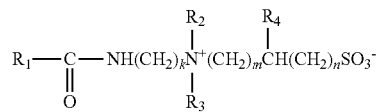

where $R_1$ is a saturated or unsaturated, linear or branched, hydrocarbon group of from about 17 to about 29 carbon atoms; $R_2$ and $R_3$ are each a straight chain or branched alkyl or hydroxyalkyl group of from 1 to about 6 carbon atoms; $R_4$ is a H, alkyl or hydroxyalkyl group of from 1 to about 4 carbon atoms; k is an integer of from 2-20; m is an integer from 1-20; and n is an integer of from 0-20, and
micro-proppant particulates having a median particle size of less than 150 μm; and
delivering the micro-proppant particulates into a secondary fracture of the wellbore.

10. The method of claim 9, wherein the fracturing fluid is introduced into the wellbore, using one or more pumps, at least at a sufficient rate and pressure to create or extend a fracture in the subterranean formation.

11. The method of claim 9, wherein introducing of the fracturing fluid is at least at a sufficient rate and pressure to initiate a primary fracture and to induce the opening of natural fractures or secondary fractures in connection with the primary factures.

12. The method of claim 9, further comprising allowing leak-off of fracturing fluid into the natural fracture or secondary fractures to enhance placement of micro-proppant particulates into the natural fractures or secondary fractures.

13. The method of claim 9, wherein the fracturing fluid is foamed with a foaming agent and a gas.

14. The method of claim 9, wherein the viscoelastic surfactant is selected from the group consisting of anionic surfactants, nonionic surfactants, hydrotropic surfactants, zwitterionic surfactants, amphoteric surfactants, and any combination thereof.

* * * * *